Figure 1:
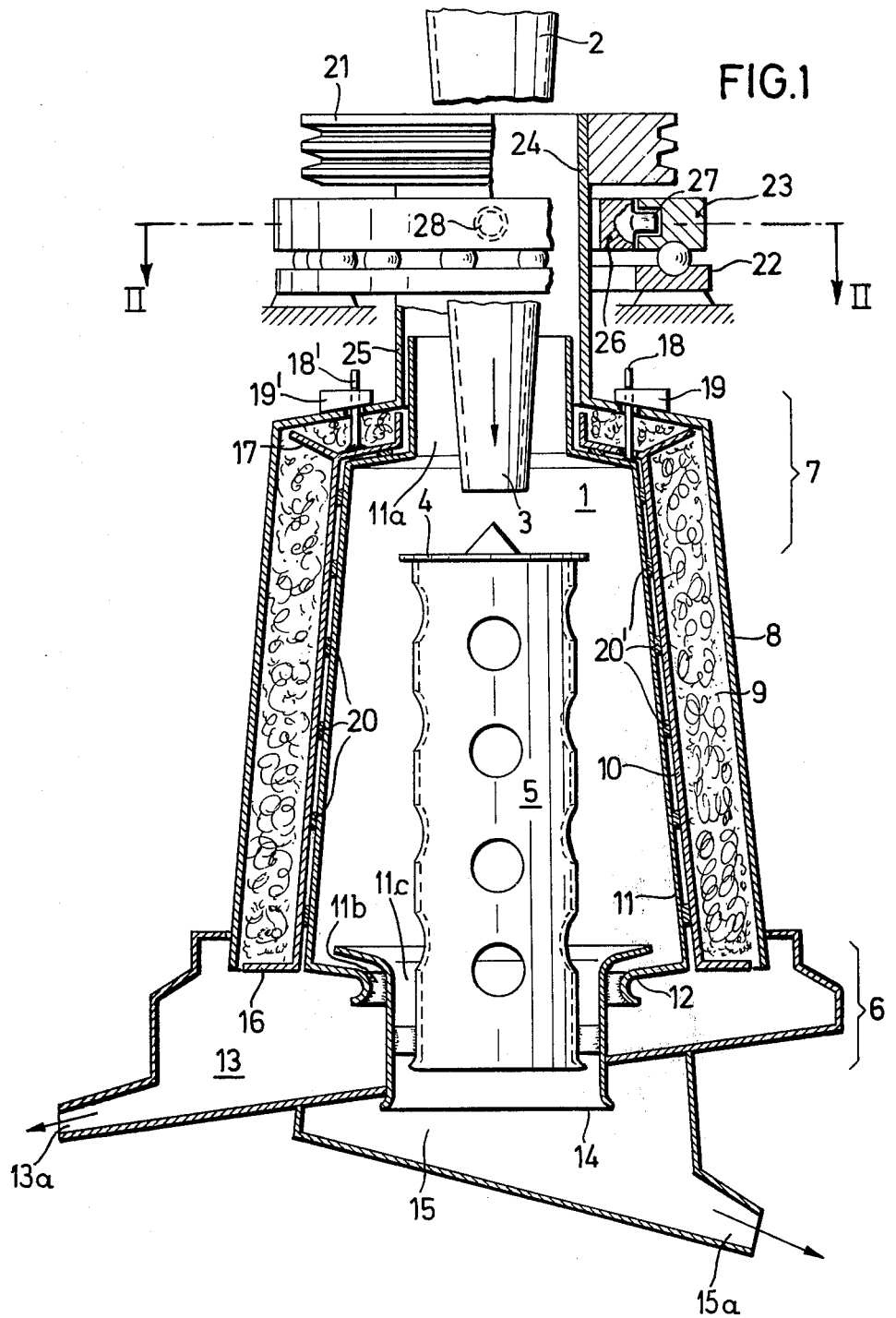

United States Patent [19]

Jakobs et al.

[11] 4,033,563

[45] July 5, 1977

[54] DEVICE FOR THE SEPARATION OF MIXTURES OF AT LEAST PARTIALLY MOLTEN METALS, METAL COMPOUNDS AND/OR METAL-CONTAINING SLAGS IN A CENTRIFUGAL FORCE FIELD

[75] Inventors: Willy Jakobs; Alfred Kryczun, both of Cologne, Germany

[73] Assignee: Klockner-Humboldt-Deutz Aktiengesellschaft, Germany

[22] Filed: Apr. 27, 1976

[21] Appl. No.: 680,673

[30] Foreign Application Priority Data

Apr. 28, 1975 Germany ............................ 2518796

[52] U.S. Cl. ............................... 266/204; 266/227; 75/63
[51] Int. Cl.² .................................... C22B 9/02
[58] Field of Search ............... 75/50, 61, 63, 93 R; 266/201, 204, 213, 227

[56] References Cited

UNITED STATES PATENTS 2,395,286  2/1946  Merle ................................. 75/93 R Primary Examiner—Gerald A. Dost
Attorney, Agent, or Firm—Hill, Gross, Simpson, Van Santen, Steadman, Chiara & Simpson

[57] ABSTRACT

A mechanism for the centrifugal separation of mixtures of molten metals and slag, including a rotary housing supported at its upper end by a gimbal ring mounted in an annular ball bearing assembly with the housing including an annular outer wall having an upwardly extending neck connected to the gimbal ring with a rotational drive thereon, an insert sleeve concentric with the outer wall and having a mineral wool insulation therebetween and an inner casing within the sleeve with an inlet opening at the upper end of the inner casing and discharge openings at the lower end of the inner casing with spacers between the casing and sleeve and mountings between the outer wall and sleeve providing for quick disconnection and axial removal of the sleeve and casing from the outer wall, and with a concentrically mounted heater extending upwardly through outlet openings in the base of the inner casing.

13 Claims, 2 Drawing Figures

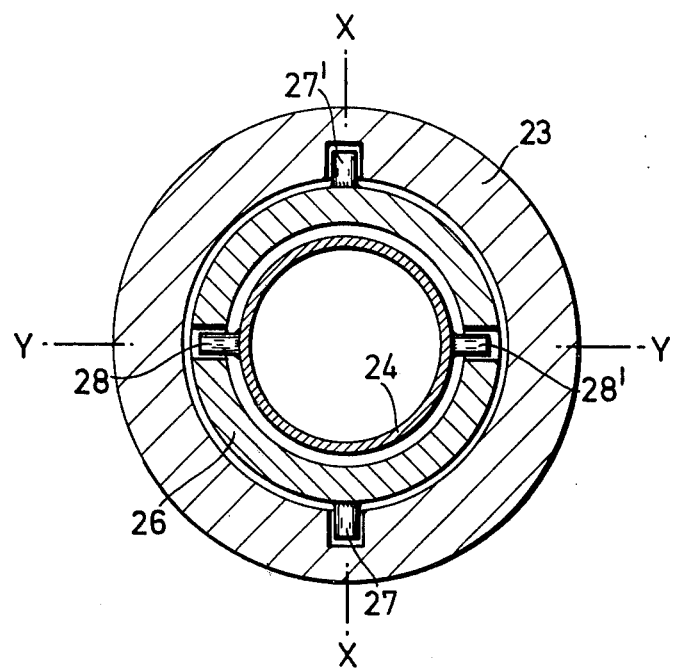

DEVICE FOR THE SEPARATION OF MIXTURES OF AT LEAST PARTIALLY MOLTEN METALS, METAL COMPOUNDS AND/OR METAL-CONTAINING SLAGS IN A CENTRIFUGAL FORCE FIELD

BACKGROUND OF THE INVENTION

The invention relates to a mechanism for the separation of hot liquid materials such as mixtures of molten metals, metal compounds or metal containing slags by centrifugal force.

Various arrangements have been heretofore employed for the separation of molten or partially molten metal and metal slag mixtures, and an example of an early structure for this purpose is illustrated in German Pat. No. 80041 dated Apr. 18, 1894. However, centrifugal separation has not gained substantial importance in the metal smelting field because of various technical difficulties encountered with apparatus heretofore available.

It is significant that in a continuous recovery process, a very important step is the final separation at the end, and if this does not adequately function, it inhibits the satisfactory operation of the entire process. To be satisfactory for continuous operation in a continuous metal recovery process, the separator must be absolutely reliable and sturdy, and must be capable of functioning under high loads with high temperature ranges, must be capable of resisting corrosion and wear and must be capable of continuous operation for long periods of time and must be capable of operation safely without requiring shut-down of the process for servicing and replacement, and if such shut-downs are necessary, replacement of parts must be done quickly and reliably.

It is accordingly an object of the present invention to provide an improved metal and slag separator which avoids disadvantages present in structures heretofore available, and provides a unit capable of safe and continuous reliable operation for use in a continuous metal refining process.

In accordance with the principles of the invention, a centrifugal separator is provided constructed of a plurality of layers arranged in a sandwich type construction so that an annular housing is provided having an outer wall which has a removable insert in its interior arranged concentrically spaced from the outer wall and supported with axially spaced mountings within the outer wall and separated therefrom by a layer of insulation. Within the sleeve insert is a casing which is adapted to contact with the molten metal and is held concentrically within the sleeve by spaced holders. Advantages of such a multilayer construction for a centrifugal separator reside in that each layer can perform to its optimum function, and the layers act in concert as a unit to provide as an entity a resultant unit having capabilities which exceed the sum of the individual capabilities of the layers. The individual selection of the layers is in accordance with the particular purpose and function required, and with this arrangement, the possibility is afforded of rapid interchangeability and replacement of a layer. In accordance with the arrangement, separate replacement and separability is possible for the insert sleeve as well as the insert casing, and a rapid separation mount and connection is provided therefor.

The function of the sleeve in combination with an insulation layer and the outer wall is for support and for heat insulation. By contrast, many devices heretofore available utilized a fire-proof mass, and the instant arrangement provides a relatively lightweight layer of mineral wool. This has an advantage in that it possesses an insulating effect superior to known fire-proof preparations and is substantially lighter. The outer wall has mechanical strength for carrying and connecting to the rotating drive and rotating support, and does not have to be of superior heat resistant material. This outer wall is made, for example, of boiler plate ST 52. The insert sleeve is preferably of a heat-proof material such as chromium steel, and the inner casing formed of a heat and corrosion resistant material such as UMCO 50 (50% Co., 27% Cr, and 23% Fe).

For supporting the inner casing within the insert sleeve because of the possibility of elastic deformation with extreme heat load, spaced holders are arranged circumferentially and axially separated formed of sheet metal elements of the same material as the inner casing.

An advantage of the construction is that it affords flexibility of the layers with respect to each accommodating the stresses occuring with heat expansion. The mounting and support of the unit is such that it has no exactly defined center of gravity, and the design and construction does not have to be critical in this respect, and this is particulary true since this location of the center of gravity changes with continual operation as it is filled and processes molten metal and slag. The advantage of this arrangement is utilized by suspending the unit on a universal or gimbal ring support at its upper end to permit free oscillation about the actual or natural center of gravity, which arrangement has not been employed in the separation of molten metals in a continual process system. With structures heretofore available, a relatively cumbersome conventional type of rigid support has been necessary increasing the cost and weight, and resulting in imbalances during operation, expensive construction due to attempts to obtain a complete original construction balance and increased wear and interruption with the necessity of having an absence of lateral or radial vibrations and disruption during centrifugal separation.

Other objects, advantages and features will become more apparent, as well as equivalent structures which are intended to be covered herein, with the teaching of the principles of the invention in connection with the disclosure of the preferred embodiment in the specification, claims and drawings in which:

DRAWINGS

FIG. 1 is a vertical sectional view taken through a centrifugal separator constructed and operating in accordance with the principles of the invention; and FIG. 2 is a horizontal sectional view taken substantially along line II—II of FIG. 1.

DESCRIPTION

As illustrated in FIG. 1, a filling spout 2 is provided leading from the discharge of a continuous metal processing unit, and the spout leads downwardly to a tapered funnel end 3 with the material flowing downwardly as indicated by the arrowed line. The molten slag and metal which is to be separated discharges from the spout end 3 onto a deflecting plate 4 which has a central conical projection aiding in the distribution of the material uniformly in all radial directions. The deflector plate 4 is mounted at the top of a cylindrical heater or combustion chamber 5 which has a cylindrically shaped outer shell with openings therein and has a burner within. The burner is not shown for sake of simplicity and may assume various forms as will be recognized by those versed in the art. For example, a gas line may be led axially upwardly into the open sleeve of the burner with a flame maintained therein, or other forms of heat energy may be provided such as an electrical heater to maintain the desired molten nature of the material being separated.

The centrifugal separation chamber is shown at 1 and tapers downwardly and outwardly to enlarge in a downward direction. The separator has a housing assembly forming the chamber 1 therein, and the rotary housing includes an annular outer wall 8 into which is inserted a concentric sleeve 10 providing a space between the sleeve and the outer wall in which is carried mineral wool insulation 9. Within the sleeve is concentrically mounted an inner casing 11 having an inlet 11a at the upper end leading to the separation chamber 1, and outlets 11b and c at the lower end.

The outlet 11b is formed in an opening at the center of a lower wall 12 of the inner casing, and the opening in the center is formed by a bead-shaped roll at the opening edge. Centrally located within the opening 11b is a ring 11c that has an outwardly flaring flange at its upper edge to leave the space 11b and to lead to the central opening 11c. Thus, the heavier separated metal, when it reaches the lower end of the chamber 1, flows out through the opening 11b, and the lighter weight slag material flows through the opening 11c. The opening 11b leads to a circular collector 13 for the metal, and the metal flows, as indicated by the arrowed line, through an outlet spout 13a. The slag is collected as it flows downwardly through the ring 14 in a circular collector 15 and flows through an outlet spout 15a, as indicated by the arrowed line.

The inner casing 11, and the sleeve 10, are each removably supported within the outer wall or shell 8. In order to support the sleeve concentrically within the shell 8, a lower outwardly extending spacing flange 16 is located at the lower end of the sleeve, and an outwardly projecting spacing flange 17 is located at the upper end of the sleeve. The lower spacing flange 16 also closes the space to hold the mineral wool insulation 9 in place.

At the upper end of the sleeve are a plurality of circumferentially spaced upwardly extending mounting pins 18'. Similar axially extending mounting pins 18 are secured to the upper end of the inner casing. The pins 18 and 18' extend axially upwardly through holes in the outer shell 8, and the pins receive locking keys 19 and 19'. These locking keys are tapered and lock the pins to hold the inner casing and the shell axially in place. For quick removal of the inner casing, the keys 19 are removed from the pins, and the casing can be pulled downwardly outwardly, and a new casing replaced. The keys 19' can be removed to release the sleeve 10, and the sleeve and casing assembly removed. The pins 18 are also accommodated by holes through the flange portion at the upper end of the sleeve 10. The keys 19 and 19' may take various forms, such as having slots so as to slide onto the pins 18 and 18' which may have relieve portions to have locking shoulders, and other suitable quick release connectors of types which will be recognized by those versed in the art, may be employed.

The inner casing 11 has a reduced upper neck portion which surrounds the inlet opening 11a. The casing is supported at circumferentially and axially spaced locations by spacers 20 and 20'. These spacers preferably take the form of sections of sheet metal formed of the same material as the casing, and may be attached to the outer surface of the casing so that they separate from the sleeve when the casing is pulled axially away from the sleeve.

For supporting the entire housing assembly, the outer shell has an annular neck portion 24 which extends upwardly. Mounted on this neck portion is a V-belt sheave 21 for receiving a V-belt drive to drive the assembly in rotation for centrifugal separation action.

The entire housing assembly is universally mounted at the upper end so that the lower end can swing free. This mounting is provided by a gimbal ring support, also shown in additional detail in FIG. 2.

The necked annular portion 24 of the shell 8 has radially extending pintle pins 28 and 28' which are journalled in openings in a gimbal ring 26. The ring has pintle pins 27 and 27' spaced 90° from the pins 28 and 28' and journalled in openings in a rotary bearing ring 23. The bearing ring is seated for rotation on ball bearings carried on a stationary bearing ring 22, FIG. 1. Thus, as the assembly is driven in rotation, it is suspended about its vertical axis in a fixed location at the upper end, but the lower end is free to assume its natural axis, and violent lateral swinging during start-up is prevented by the ring 14 at the lower end. The gimbal ring support permits universal movement of the lower end about the pivot axes X—X and Y—Y.

In operation, material to be separated will be supplied through the inlet spout 2 to be fed down into the centrifugal chamber 1. The housing assembly is driven in rotation by the pulley 21, and the lower end moves to find its natural vertical axis because of the support by the gimbal ring assembly at the upper end, as shown in FIG. 2. For rapid replacement of parts, the rotation is stopped, and the keys 19 removed to pull out the inner casing. The keys 19' may be removed to pull out the sleeve and casing assembly. Replacement units can rapidly be slipped in place and relocked by replacement of the keys, and the mechanism again started. For axial replacement, the collectors 13 and 15 will be moved downwardly out of the way.

We claim as our invention:

1. A mechanism for the centrifugal separation of hot liquid materials such as mixtures of molten metals and slag comprising in combination:
   a rotary housing for rotation about a central axis having a separation chamber therein with an inlet opening at one end for material to be separated and outlet openings at the other end for separated materials;
   mounting means for supporting the housing for rotation;
   an annular outer wall for said housing;
   an insert sleeve concentric with and spaced inwardly from said outer wall;
   an inner casing concentrically mounted within the sleeve forming said chamber;
   a mounting between the outer wall and sleeve;
   a layer of insulation between said sleeve and outer wall;
   and spacers between the casing and sleeve supporting the casing concentrically therein.

2. A mechanism for the centrifugal separation of hot liquid materials such as mixtures of molten metals and slag constructed in accordance with claim 1:

wherein said mounting includes a releasable connection for moving the sleeve concentrically out of the annular outer wall with the casing contained therein.

3. A mechanism for the centrifugal separation of hot liquid materials such as mixtures of molten metals and slag constructed in accordance with claim 1:
wherein said insulation is formed of mineral wool.

4. A mechanism for the centrifugal separation of hot liquid materials such as mixtures of molten metals and slag constructed in accordance with claim 1:
wherein said outer wall is constructed of a non-heat resistant metal of high mechanical strength and said sleeve is formed of a heat-proof material and said casing is formed of heat and corrosion resistant material.

5. A mechanism for the centrifugal separation of hot liquid materials such as mixtures of molten metals and slag constructed in accordance with claim 4:
wherein said outer wall is formed of a boiler plate, said sleeve is formed of chromium steel and said inner casing is formed of a metal alloy containing cobalt, chromium and iron.

6. A mechanism for the centrifugal separation of hot liquid materials such as mixtures of molten metals and slag constructed in accordance with claim 1:
wherein said spacers are at axially separated spaced locations and are formed of the material of said inner casing.

7. A mechanism for the centrifugal separation of hot liquid materials such as mixtures of molten metals and slag constructed in accordance with claim 1:
wherein said housing depends downwardly with the inlet opening located at the upper end and said mounting means is in the form of a rotary bearing at the upper end with a universal support connection between the bearing and the housing permitting the lower end of the housing to move radially.

8. A mechanism for the centrifugal separation of hot liquid materials such as mixtures of molten metals and slag constructed in accordance with claim 1:
including a heater coaxially projecting upwardly from the lower end within said inner casing.

9. A mechanism for the centrifugal separation of hot liquid materials such as mixtures of molten metals and slag constructed in accordance with claim 8:
wherein said heater has a centrally located conically shaped distributor facing the inlet opening.

10. A mechanism for the centrifugal separation of hot liquid materials such as mixtures of molten metals and slag constructed in accordance with claim 1:
wherein said housing rotates about a vertical axis and has an upwardly extending neck portion and said mounting means includes a gimbal ring support connected to said neck portion with the gimbal ring support mounted in an annular bearing coaxial with the axis of the housing.

11. A mechanism for the centrifugal separation of hot liquid materials such as mixtures of molten metals and slag constructed in accordance with claim 1:
wherein said mounting between the outer wall and sleeve includes annular flanges at the ends of the sleeve which are concentrically spacing the sleeve within the outer wall and circumferentially spaced axially extending releasable connectors extend between the sleeve and inner casing and the outer wall for rapid removal of the sleeve and inner casing.

12. A mechanism for the centrifugal separation of hot liquid materials such as mixtures of molten metals and slag constructed in accordance with claim 1:
wherein said housing rotates about a vertical axis with the inlet opening at the upper end and said outer wall, sleeve and casing are conically shaped increasing in diameter in a downward direction.

13. A mechanism for the centrifugal separation of hot liquid materials such as mixtures of molten metals and slag constructed in accordance with claim 1:
wherein one of said outlet openings is formed at the center of an annular wall at the base of said inner casing, and the other of said outlet openings is formed within an annular ring spaced concentrically within the first outlet opening, and a heater concentrically located within the inner casing supported within said ring.

* * * * *